(12) United States Patent
Meiri et al.

(10) Patent No.: US 10,534,547 B2
(45) Date of Patent: Jan. 14, 2020

(54) CONSISTENT TRANSITION FROM ASYNCHRONOUS TO SYNCHRONOUS REPLICATION IN HASH-BASED STORAGE SYSTEMS

(71) Applicant: EMC Corporation, Hopkinton, MA (US)

(72) Inventors: David Meiri, Cambridge, MA (US); Irit Yadin Lempel, Caesarea (IL); Tal Ben-Moshe, Kiryat Ono (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/982,951

(22) Filed: Dec. 29, 2015

(65) Prior Publication Data

US 2017/0185326 A1 Jun. 29, 2017

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ...... G06F 3/0641; G06F 3/0646; G06F 3/065; G06F 2201/84; G06F 12/1018; G06F 11/1453; G06F 11/2074; G06F 11/2076
See application file for complete search history.

(56) References Cited

U.S. PATENT DOCUMENTS

| 7,257,653 | B1 * | 8/2007 | Marshak | G06F 11/2071 710/74 |
|---|---|---|---|---|
| 9,817,606 | B1 * | 11/2017 | Byrne | G06F 3/065 |
| 2006/0195666 | A1 * | 8/2006 | Maruyama | G06F 3/0613 711/162 |
| 2008/0244035 | A1 * | 10/2008 | Horie | G06F 3/0613 709/217 |
| 2012/0017060 | A1 * | 1/2012 | Kapanipathi | G06F 3/0608 711/162 |
| 2013/0073820 | A1 * | 3/2013 | Watanabe | G06F 3/0611 711/162 |
| 2013/0111187 | A1 * | 5/2013 | Liu | G06F 3/0614 711/216 |
| 2015/0234860 | A1 * | 8/2015 | Sakaguchi | G06F 11/3485 707/622 |

* cited by examiner

*Primary Examiner* — Edward J Dudek, Jr.
*Assistant Examiner* — Andrew Russell
(74) *Attorney, Agent, or Firm* — Krishnendu Gupta; Lesley Leonessa

(57) ABSTRACT

A System, computer program product, and computer-executable method of transitioning replication on a data storage system including a production site and a replication site from asynchronous replication to synchronous replication, the System, computer program product, and computer-executable method including receiving a request to transition from asynchronous replication to synchronous replication and changing the data storage system to a transition mode, wherein the data storage system transitions the data storage system from using asynchronous replication to synchronous replication.

20 Claims, 11 Drawing Sheets

US 10,534,547 B2

CONSISTENT TRANSITION FROM ASYNCHRONOUS TO SYNCHRONOUS REPLICATION IN HASH-BASED STORAGE SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, computer program product, and computer-executable method of transitioning replication on a data storage system including a production site and a replication site from asynchronous replication to synchronous replication, the System, computer program product, and computer-executable method including receiving a request to transition from asynchronous replication to synchronous replication and changing the data storage system to a transition mode, wherein the data storage system transitions the data storage system from using asynchronous replication to synchronous replication.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

as shown in FIG. 1) transitioning from asynchronous replication to synchronous replication, in accordance with an embodiment of the present disclosure;

Like reference symbols in the various drawings indicate like elements.

DETAILED DESCRIPTION

Figure 1:
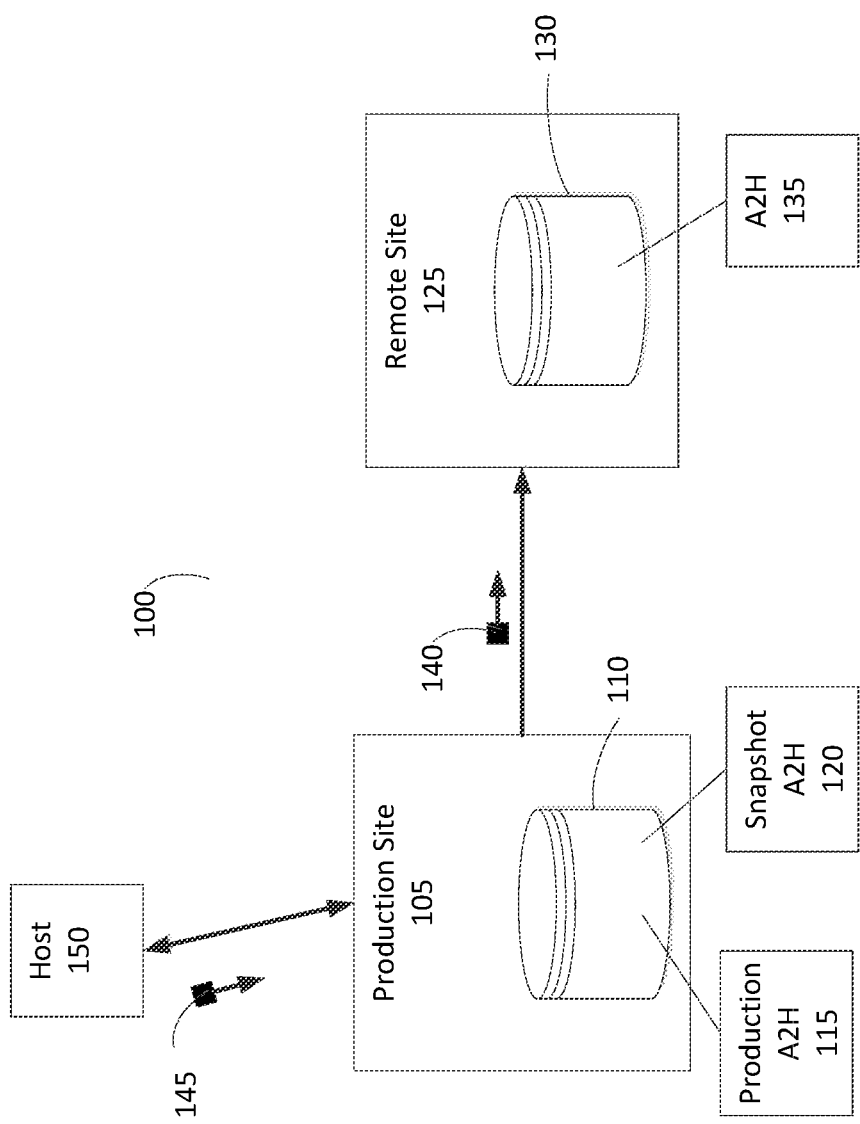
FIG. 1 is a simplified illustration of a data storage system replicating from a production site to a remote site, in accordance with an embodiment of the present disclosure.

Traditionally, many distributed systems use a consistent snapshot mechanism to replicate data between a source site and a remote site. Typically, distributed systems either handle synchronous or asynchronous replication. Conventionally, while some distributed systems can switch from asynchronous to synchronous replication, current techniques cause long transition times while switching. Generally, a distributed system stops or holds incoming I/Os while the distributed system converts from synchronous to asynchronous replication, or vice versa. Conventionally, improvements to current replication techniques would be beneficial to the data storage industry.

In many embodiments, the current disclosure may enable a production system, replicating to a remote site, to transition from asynchronous replication to synchronous replication. In various embodiments, the current disclosure enables transition between asynchronous replication and synchronous replication without full resynchronization, which would be very lengthy, requiring copying entire volumes even if only a tiny percentage of the data changed. In most embodiments, the current disclosure may enable a non-disruptive transition of types of replication while a user may be enabled to continually have a consistent copy on the remote site. In various embodiments, the current disclosure may provide for a smooth performance transition from asynchronous replication to synchronous replication, or vice versa, instead of a one-time large hit in performance. In certain embodiments, the current disclosure may enable a gradual performance penalty, potentially over minutes or hours, until full synchronization replication may be achieved.

Snapshot Mechanism

The present embodiments relate in one aspect to a snapshot of a thinly provisioned volume or other logical data construct, which snapshot comprises metadata relating to changed parts of the address range only in relation to an ancestor, and is thus in itself only thinly provisioned. The snapshot may be part of a hierarchy of snapshots wherein the metadata for a given location may be placed at the point in which it first appears in the hierarchy and which metadata is pointed to by later snapshots.

According to an aspect of some embodiments of the present invention there is provided a memory management system for a memory volume, the system comprising a snapshot provision unit configured to take a given snapshot of the memory volume at a given time, the snapshot comprising a mapping table and memory values of the volume, the mapping table and memory values comprising entries for addresses of the physical memory containing data, which values entered differ from an ancestor of the snapshot.

In an embodiment, the volume is a thinly provisioned memory volume in which a relatively larger virtual address range of virtual address blocks is mapped to a relatively smaller physical memory comprising physical memory blocks via a mapping table containing entries only for addresses of the physical memory blocks containing data.

In an embodiment, the given snapshot is part of a hierarchy of snapshots taken at succeeding times, and wherein the snapshot provision unit is configured to provide the entries to the given snapshot for addresses of the physical memory to which data was entered subsequent to taking of a most recent previous snapshot in the hierarchy, and to provide to the given snapshot pointers to previous snapshots in the hierarchy for data entered prior to taking of a most recent previous snapshot.

In an embodiment, the snapshot provision unit is configured to create a read-only version of the thinly provisioned memory volume to provide a fixed base for the hierarchy.

In an embodiment, the snapshot provision unit is configured to provide a first tree structure of the hierarchy to indicate for each written memory block a most recent ancestor snapshot of a queried snapshot containing a respective entry.

In an embodiment, the snapshot provision unit comprises a read function which traverses the first tree structure to read a value of a given block, and a write function which writes a block value to a most recent snapshot in the hierarchy.

In an embodiment, the snapshot provision function is configured to provide a second tree structure, the second tree structure indicating, for each written memory block, which level of the hierarchy contains a value for the block.

In an embodiment, the snapshot provision unit comprises a read function configured to traverse the second memory structure to find a level of the hierarchy containing a value for a requested block and then to use the first memory structure to determine whether the level containing the value is an ancestor in the hierarchy of a level from which the block was requested.

In an embodiment, the snapshot provision unit further comprises a delete function for deleting snapshots, wherein for a snapshot to be deleted which has a single sibling, values of sibling and parent nodes are merged into a single node.

In an embodiment, the physical memory comprises random access memory disks.

In an embodiment, the blocks are of a granularity of one member of the group consisting of less than 100 k, less than 10 k and 4 k.

In an embodiment, the snapshot provision unit is configured to align mapping data of a respective snapshot to a page of memory.

In an embodiment, the snapshot provision unit is configured to provide a third tree structure, the third tree structure returning a Depth-First Search ordering of respective snapshots of the hierarchy, such that leaves of each snapshot are ordered consecutively and that if a snapshot A is an ancestor of a snapshot B then the ordering of leaves of A completely overlaps that of B.

In an embodiment, the snapshot provisioning unit is configured with a read function, the read function configured to use the third tree structure to obtain a list of snapshots having a value at a requested memory address, and to find a closest ancestor in the list of a requesting snapshot by traversing the snapshots of the list and returning a respective snapshot of the list which is an ancestor of the requesting snapshot and has a minimum number of leaves.

In an embodiment, the snapshot provision unit is configured to provide an indirection layer or a look-aside table to provide data deduplication.

According to a second aspect of the present invention there is provided a memory management method comprising taking a given snapshot of a memory volume at a given time, providing the snapshot with a mapping table and memory values of the volume, the mapping table and memory values comprising entries for addresses of the physical memory containing data, and wherein the values differ from data in an ancestor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

More information regarding snapshot mechanisms may be found in U.S. patent application Ser. No. 13/470,317 entitled "Snapshot Mechanism" which is commonly assigned herewith and incorporated by reference herein.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not world-wide unique, they cannot be easily used to check if a target contains a hash signature. In some implementations, short hash handles are shortcuts for hash signatures, and can give a reliable hint of the existence of a hash signature in an array. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

More information regarding Hash-Based Replication may be found in U.S. patent application Ser. No. 14/037,577 entitled "Hash-Based Replication" which is commonly assigned herewith and incorporated by reference herein.

Transitioning from Asynchronous to Synchronous Replication

In many embodiments, the current disclosure may enable a data storage system to transition from asynchronous replication to synchronous replication. In various embodiments, the current disclosure may enable transition between types of replication with a minimal impact to the data storage system. In certain embodiments, the current disclosure may enable a data storage system to spread an impact of transitioning replication types over minutes, hours, and/or days depending on configuration.

In most embodiments, a data storage system may include a production site and a remote site. In various embodiments, a production site and remote site may be Content Addressable Storage (CAS). In certain embodiments, in CAS, volume data may be stored as a combination of an address to hash metadata table (A2H) and backend hash-indexed disk storage. In some embodiments, the current disclosure may enable a data storage system to complete a transition from asynchronous replication to synchronous replication within three (3) cycles, while keeping the remote site consistent and minimizing impact on host writes to the production site.

In many embodiments, at the start of an asynchronous to synchronous transition, a starting point may be a stable system in asynchronous replication mode. In various embodiments, data management of a data storage system periodically creates snapshots and replicates differences between the most recent snapshot and a previous snapshot to a remote site asynchronously.

In most embodiments, a data storage system may receive a request to transition from asynchronous replication to synchronous replication. In various embodiments, a data storage system may wait until a new snapshot may be created and asynchronously replicated from a production site to a remote site. In these embodiments, a data storage system may be placed into a transition mode, where the data storage system may be enabled to initiate a transition from asynchronous replication to synchronous replication. In certain embodiments, during a transition mode, a data storage system may be enabled to execute synchronous replication commands and asynchronous commands simultaneously.

In most embodiments, a data storage system in transition mode may use a scanning process to compare an A2H table of a production site with an A2H table of the recently created snapshot. In various embodiments, a data storage system may scan the A2H tables from beginning to end. In some embodiments, a data storage system may scan an A2H table one entry at a time. In other embodiments, a data storage system may be enabled to scan multiple entries of an A2H table before processing. In some embodiments, if a scanning process determines that differences exist between a production A2H table and a snapshot A2H table, the scanning process may lock the production A2H table entry and place the entry into a buffer ready to replicate to the remote site. In various embodiments, an entry of an A2H table may be locked to prevent a host from updating the entry. In some embodiments, a scanning process may lock and replicate individual entries. In other embodiments, a scanning process may lock and replicate multiple entries at once. In some embodiments, a scanning process may immediately replicate an entry to a remote site. In certain embodiments, a remote site may include a buffer to receive replicated data. In other embodiments, a remote site may be enabled to handle received replicated data immediately. In most embodiments, upon completion of replication of a locked entry, the scanning process may unlock the entry and continue scanning the production A2H table.

In various embodiments, while the scanning process is being executed, the data storage system may be enabled to execute asynchronous and synchronous replication on data associated with the production A2H table. In most embodiments, a data storage system may allow entries within a production A2H table that may not have been scanned by the scanning process to be updated asynchronously. In those embodiments, updated A2H table entries may be asynchronously replicated when a scanning process processes the entry. In certain embodiments, a production A2H table entry that has not been processed by a scanning process may be enabled to be updated multiple times before being asynchronously replicated by the scanning process. In various embodiments, data updates for production A2H table entries already scanned by the scanning process may be immediately synchronously replicated to a remote site. In most embodiments, as a scanning process progresses through a production A2H table, the data storage system slowly transitions from asynchronous replication to synchronous replication. In various embodiments, once the scanning process is complete, the data storage system may be enabled to change from transition mode to synchronous replication mode.

Refer to the example embodiment of FIG. 1. FIG. 1 is a simplified illustration of a data storage system replicating from a production site to a remote site, in accordance with an embodiment of the present disclosure. Data storage system 100 includes production site 105 and remote site 125. In many embodiments, a production site and/or remote site may be a data storage array and/or data storage device that may be enabled to store one or more volumes. In various embodiments, a production site and/or remote site may be enabled to asynchronously and/or synchronously replicate to a secondary site. Production site 105 includes volume 110 which is enabled to store data from applications, hosts, and/or users utilizing production site 105. Production site 105 includes production A2H table 115 which is enabled to map addresses to hash values for volume 110 on production site 105. Production site 105 is enabled to include snapshot A2H table 120 which is enabled to map address to hash values of a snapshot created from volume 110

In this embodiment, Remote site 125 includes volume 130 which stores replicated data from production site 105. Remote site 125 includes A2H table 135 which contains a mapping of addresses to Hashes stored within volume 130. As shown, data storage system 100 is enabled to replicate data from production site 105 to remote site 125 using message 140. Message 140 is enabled to contain replication data, which may include differences between snapshots and/or snapshot data in its entirety. Data storage system 100 is enabled to minimize an amount of data transferred using message 140.

Figure 2:
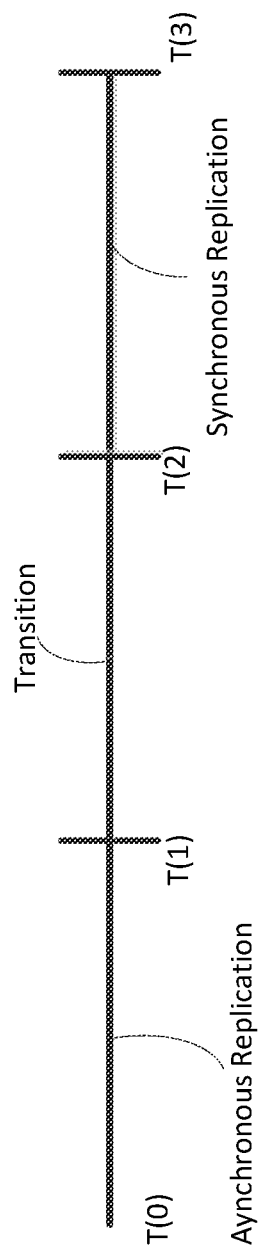
FIG. 2 is a simplified illustration of a timeline of a data storage system (i.e.

Refer to the example embodiment of FIG. 2. FIG. 2 is a simplified illustration of a timeline of a data storage system (i.e. as shown in FIG. 1) transitioning from asynchronous replication to synchronous replication, in accordance with an embodiment of the present disclosure. As shown, the timeline includes three cycles. During the first cycle, between T(0) and T(1), the data storage system 100 (FIG. 1) is replicating data in asynchronous mode. In this mode, production site 105 (FIG. 1) periodically asynchronously replicates to remote site 125 (FIG. 1). During the second cycle, between T(1) and T(2), data storage system 100 (FIG. 1) changes to a transition mode which is enabled to handle asynchronous replication and synchronous replication simultaneously while transitioning to replicating fully in synchronous mode. During the third cycle, between T(2) and T(3), data storage system 100 (FIG. 1) has fully transitioned into Synchronous Replication mode and continues in Synchronous replication mode.

Figure 3A:
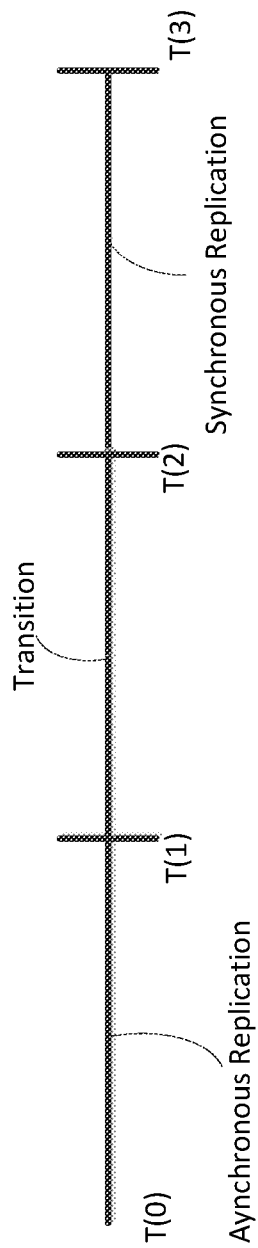
FIGS. 3A-3F are simplified illustrations of state diagrams of a data storage system (as shown in FIG. 1) during a transition from asynchronous replication to synchronous replication, in accordance with an embodiment of the present disclosure.

Refer to the example embodiments of FIGS. 3A-3F. FIGS. 3A-3F are simplified illustrations of state diagrams of a data storage system (as shown in FIG. 1) during a transition from asynchronous replication to synchronous replication, in accordance with an embodiment of the present disclosure. FIG. 3A shows a first state of data storage system 100 (FIG. 1) where data storage system 100 (FIG. 1) is replicating in asynchronous mode. In this embodiment, data storage system 100 (FIG. 1) is in cycle one (1) between T(0) and T(1). Table 305 shows the A2H table for production site 105 (FIG. 1). As shown, data storage system 100 (FIG. 1) is asynchronously replicating data from production site 105 (FIG. 1) to remote site 125 (FIG. 1).

Figure 3B:
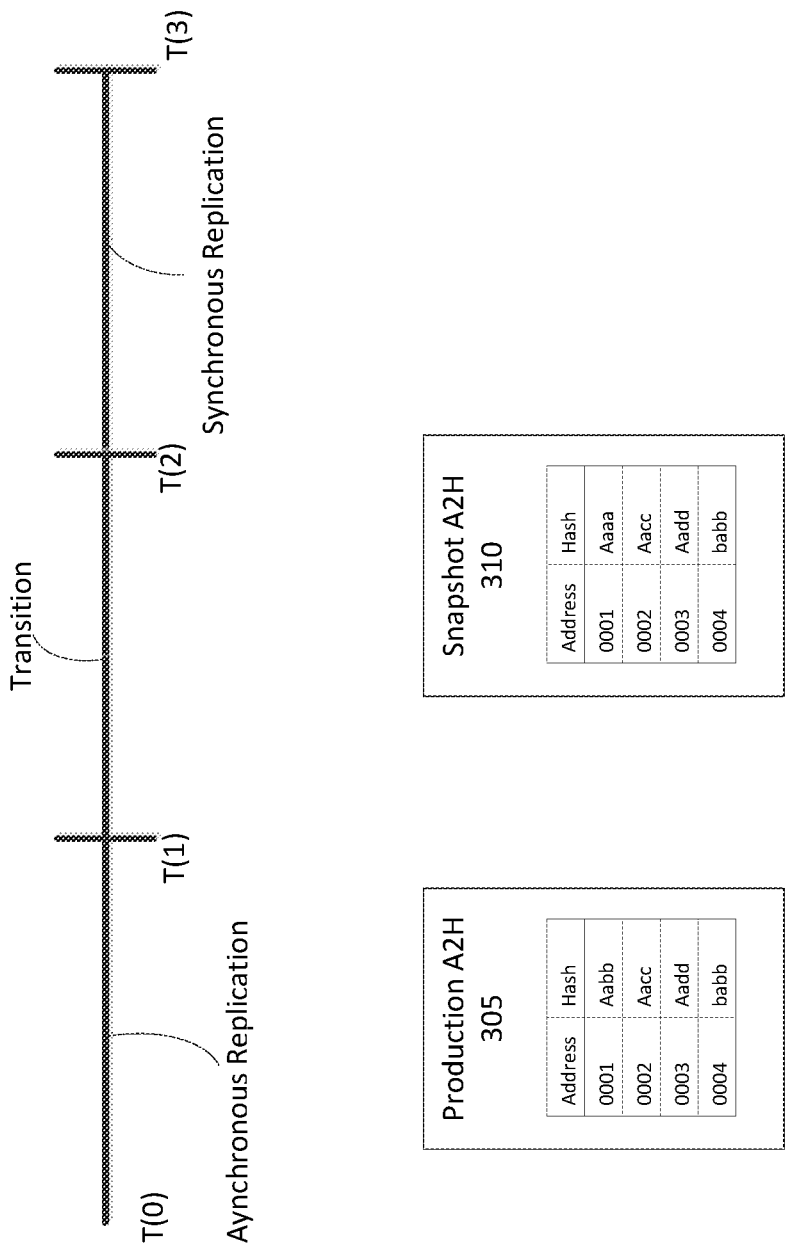

FIG. 3B shows a second state of data storage system 100 (FIG. 1). In this embodiment, Data storage system 100 (FIG. 1) has received a request to transition from Asynchronous replication to synchronous replication. In many embodiments, a request to transition may come from an application, host machine, user, and/or administrator of the data storage system. Data storage system 100 (FIG. 1) waits for a snapshot to be created and associated A2H table 310. Data Storage system 100 (FIG. 1) is enabled to move into transition mode and initiate the change from asynchronous replication to Synchronous replication.

Figure 3C:
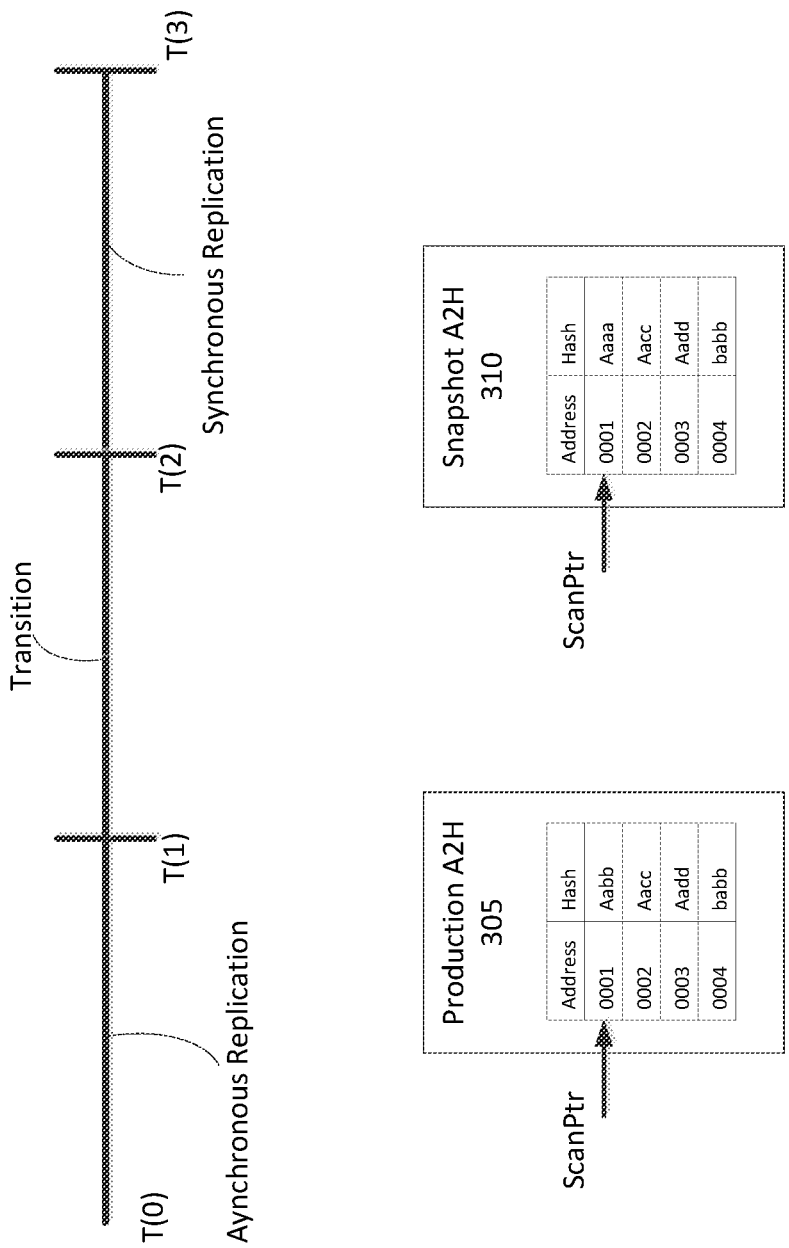

FIG. 3C shows a third state of data storage system 100 (FIG. 1). In this embodiment, data storage system 100 (FIG. 1) is in transition mode, between time T(1) and T(2), and is enabled to scan both Production A2H 305 and Snapshot A2H 310 to determine whether differences exist between the A2H 310 and A2H 305. The scanning process is determining whether any updates have been received by production site 105 (FIG. 1) since the snapshot associated with A2H 305 was created. In this embodiment, data storage system 100 (FIG. 1) is scanning A2H 305 and A2H 310 incrementally start at address "0001". Upon finding a difference, data storage system 100 (FIG. 1) is enabled to lock the associated entry in A2H table 305 and asynchronously replicate the entry to remote site 125 (FIG. 1). Once scanned and asynchronously replicated, as needed, data storage system 100 (FIG. 1) is enabled to unlock a previously locked entry and continue comparing A2H 305 and A2H 310. In some embodiments, where a data storage system may not be enabled to lock an entry within an A2H table, the data storage system may be enabled to instantly replicate the difference to a remote site and move to the next entry. In certain embodiments, where a data storage system may be enabled to lock entries of an A2H table, the data storage system may be enabled to lock and set aside one or multiple entries for Asynchronous replication at a later time, i.e., such as when a buffer and/or size limit may be reached.

Figure 3D:
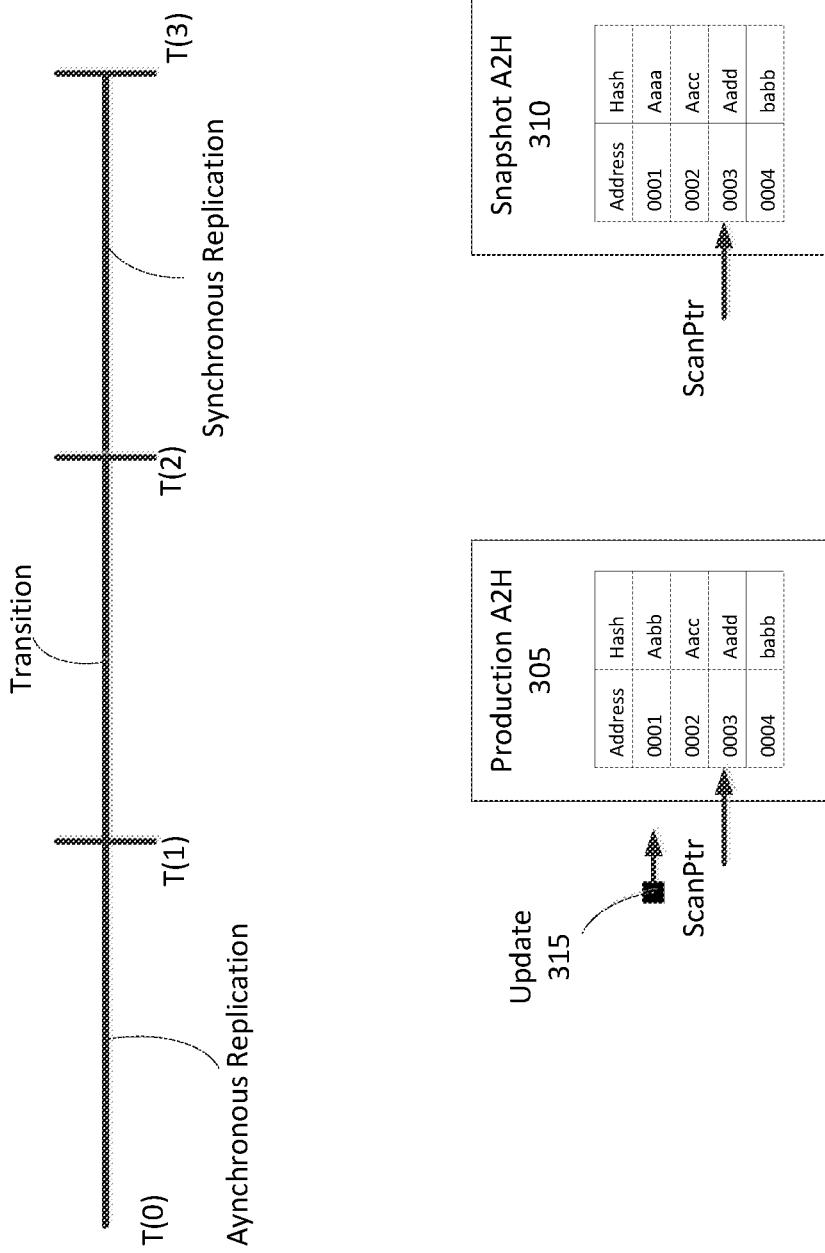

FIG. 3D shows a fourth state of a data storage system 100 (FIG. 1). In this embodiment, data storage system 100 (FIG. 1) is currently in transition mode and is in processes of scanning production A2H 305 and Snapshot A2H 310. The scanning pointer is currently processing address "0003" while update 315 is being received at production site 105 on data storage system 100. As shown, update 315 is directed towards address "0001" which data storage system 100 has already scanned. As such, data storage system 100 handles update 315 by synchronous replication to remote site 125.

Figure 3E:
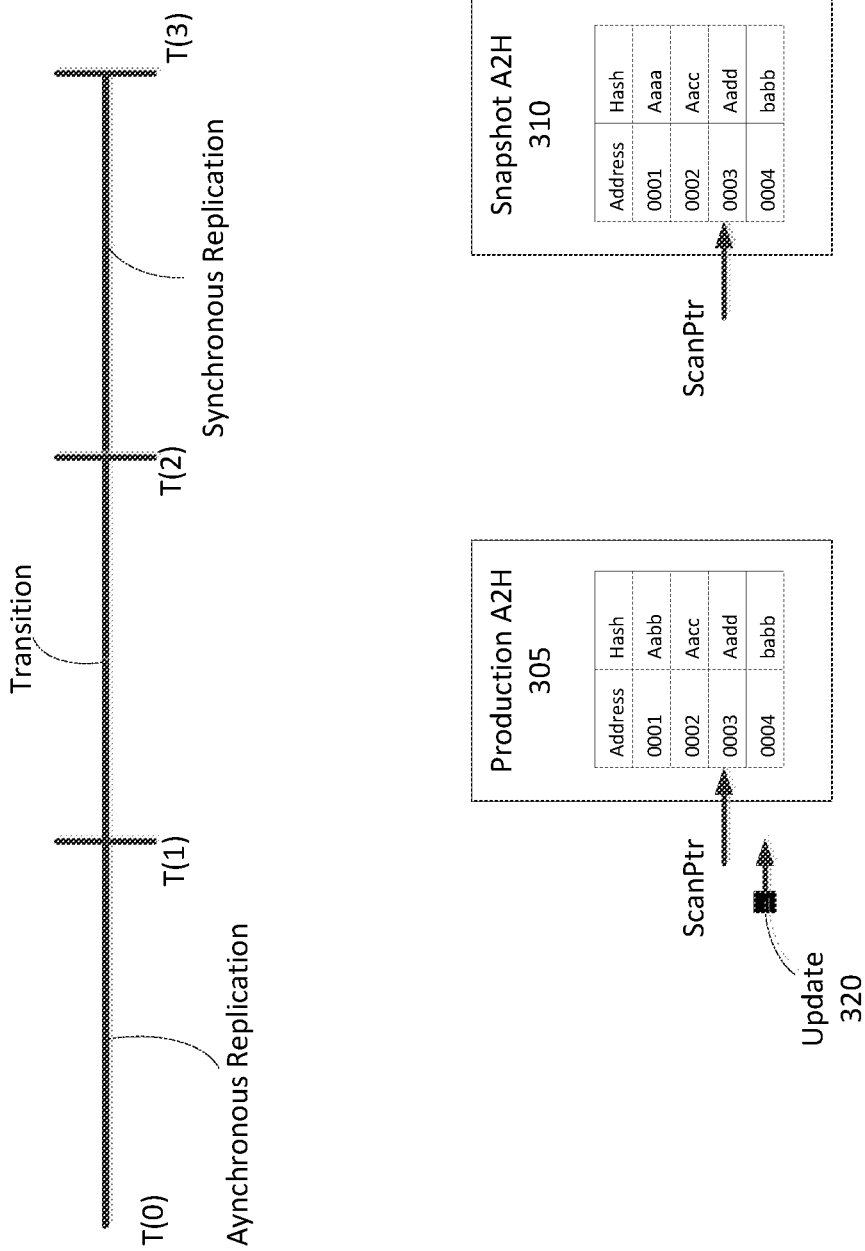

FIG. 3E shows a fifth state of a data storage system 100 (FIG. 1). In this embodiment, data storage system 100 (FIG. 1) is currently in transition mode and is still in process of scanning Production A2H table 305 and snapshot A2H table 310. Data storage system 100 (FIG. 1) is currently scanning the entry at address "0003". As shown, data storage system 100 has received update 320 for data stored on production site 105 (FIG. 1). Update 320 contains an update to data associated with address "0004". As data storage system 100 has not yet scanned entry for address "0004", data storage system 100 updates entry for address "0004" and responds to the update request that the update request is complete. As data storage system 100 has not yet scanned entry at address "0004", data storage system 100 waits to replicate entry at address "0004" until the entry has been scanned. Upon being scanned by data storage system 100, entry for address "0004" gets asynchronously replicated to remote site 125. In many embodiments, updates to entries in a production A2H table that is in transition mode may happen multiple times. In various embodiments, if multiple updates are made to an entry before being scanned, a data storage system may wait to asynchronously replicate until the entry may be scanned. In certain embodiments, each update to an entry after being scanned may be synchronously replicated to a remote site from the production site.

Figure 3F:
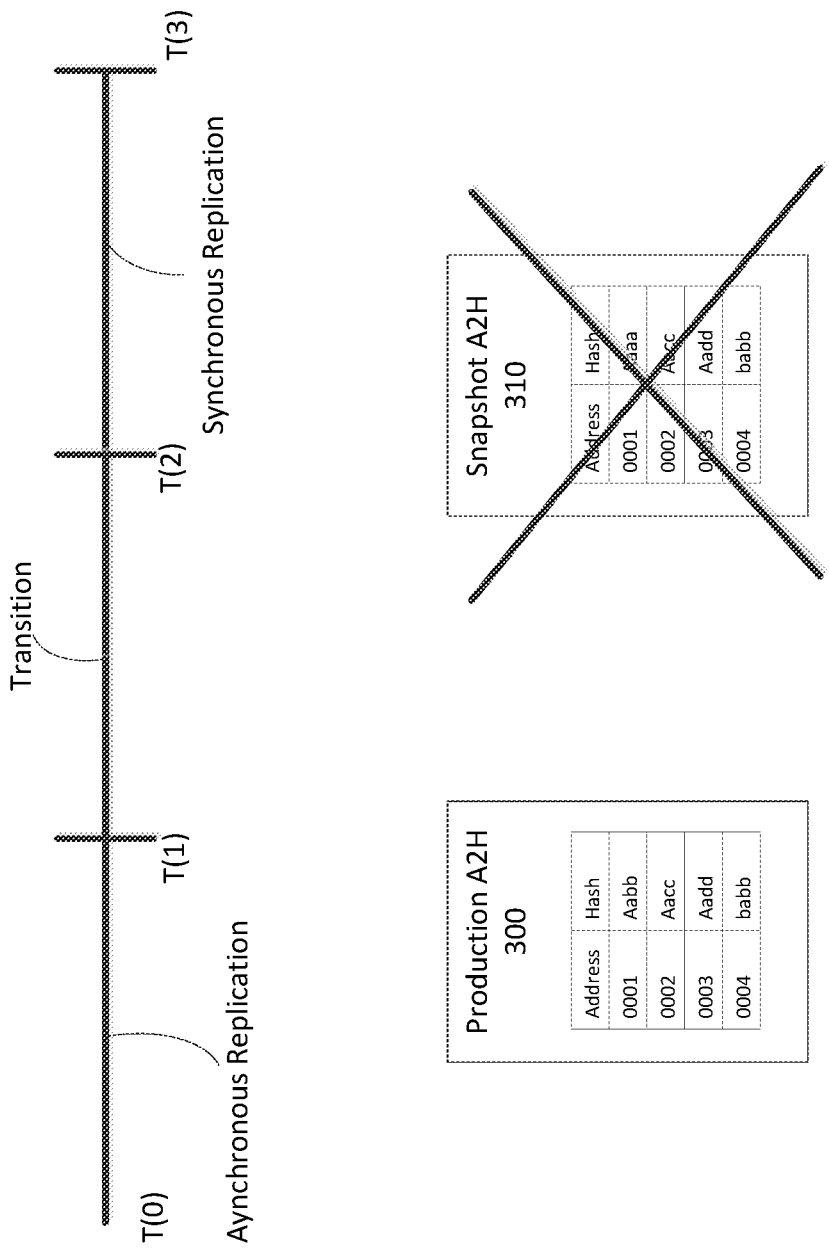

FIG. 3F shows a sixth state of a data storage system 100 (FIG. 1). In this embodiment, data storage system 100 (FIG. 1) has completed scanning production A2H 305 and snapshot A2H 310. Upon completion, data storage system 100 (FIG. 1) deletes snapshot A2H 310 and changes to synchronous replication mode. Updates received after the change to synchronous replication mode will managed only using synchronous replication unless a request is made to transition to another mode, i.e. back to asynchronous replication mode and/or stop replication.

Figure 4:
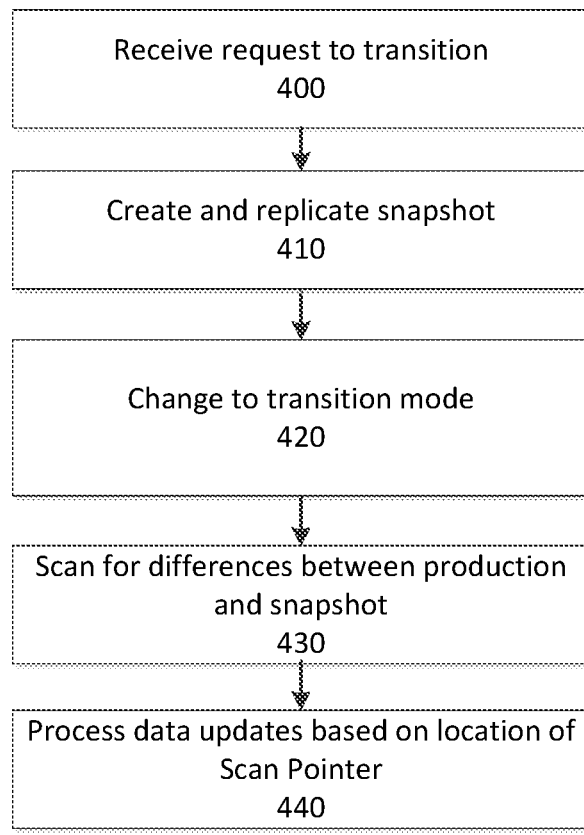
FIG. 4 is a simplified flowchart of a method of transitioning from asynchronous replication to synchronous replication using a data storage system shown in FIG. 1, in accordance with an embodiment of the present disclosure.

Refer to the example embodiments of FIGS. 1 and 4. FIG. 4 is a simplified flowchart of a method of transitioning from asynchronous replication to synchronous replication using a data storage system shown in FIG. 1, in accordance with an embodiment of the present disclosure. Data storage system 100 includes production site 105 and remote site 125. Host 150 utilizes volume 110 for data storage within production site 105. Currently data stored within data storage system 100 is being asynchronously replicated from production site 105 to remote site 125. Production site 105 receives a request, in message 145, to transition from asynchronous replication to synchronous replication (Step 400). Data storage system 100 creates and replicates a snapshot of production site 105 (Step 410). Data storage system 100 changes to transition mode (Step 420). Data storage system 100 initializes scanning process to scan for differences between production data and the snapshot (Step 430). Scanning for differences includes determining differences between Production A2H 115 and Snapshot A2H 120 to determine whether updates have been received since the snapshot associated with Snapshot A2H 120 was created. As Production A2H 115 and Snapshot A2H 120 are being scanned, data storage system slowly transitions from asynchronous replication to synchronous replication and processes received data updates based on the location of the scan pointer used during scanning (Step 440). If an update received is associated with an already scanned portion of the production A2H 115, data storage system 100 will synchronously replicate the received update to remote site 125. If an update received is associated with an unscanned portion of the production A2H 115, data storage system 100 will update the production A2H 115 table and asynchronously replicate the data when the updated entry of the production A2H 115 table is scanned.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 5:
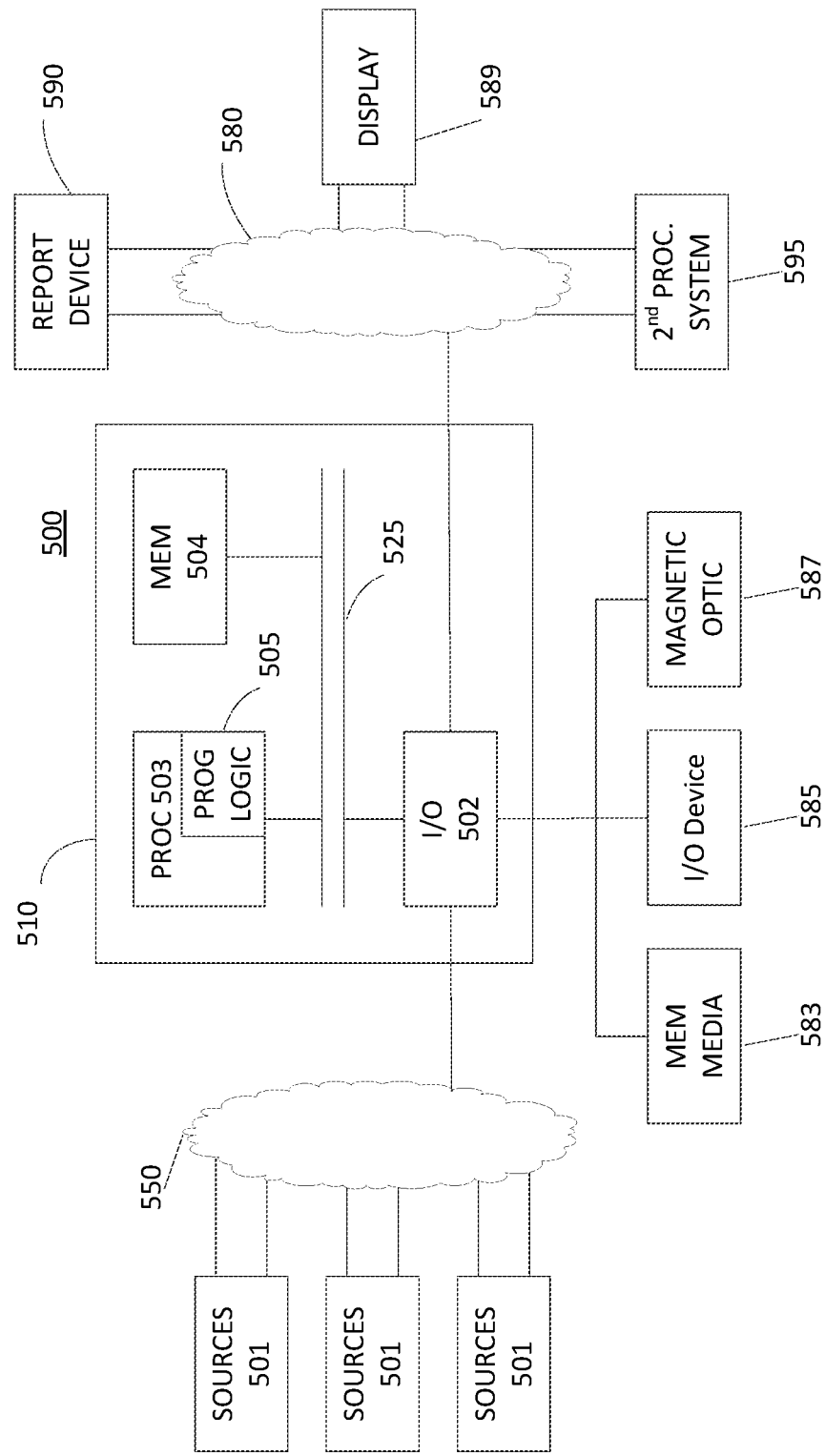
FIG. 5 is an example of an embodiment of an apparatus that may utilize the techniques described herein, in accordance with an embodiment of the present disclosure.

FIG. 5 is a block diagram illustrating an apparatus, such as a computer 510 in a network 500, which may utilize the techniques described herein according to an example embodiment of the present invention. The computer 510 may include one or more I/O ports 502, a processor 503, and memory 504, all of which may be connected by an interconnect 525, such as a bus. Processor 503 may include program logic 505. The I/O port 502 may provide connectivity to memory media 583, I/O devices 585, and drives 587, such as magnetic drives, optical drives, or Solid State Drives (SSD). When the program code is loaded into memory 504 and executed by the computer 510, the machine becomes an apparatus for practicing the invention. When implemented on one or more general-purpose processors 503, the program code combines with such a processor to provide a unique apparatus that operates analogously to specific logic circuits. As such, a general purpose digital machine can be transformed into a special purpose digital machine.

Figure 6:
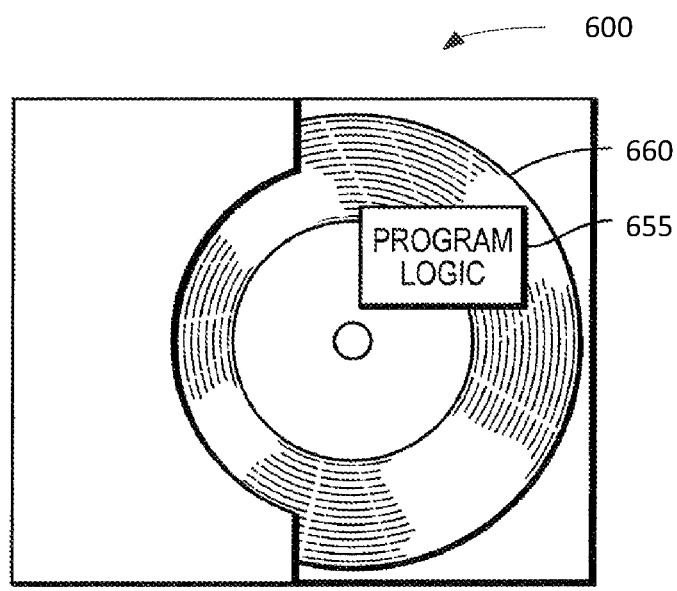
FIG. 6 is an example of a method embodied on a computer readable storage medium that may utilize the techniques described herein, in accordance with an embodiment of the present disclosure.

FIG. 6 is a block diagram illustrating a method embodied on a computer readable storage medium 660 that may utilize the techniques described herein according to an example embodiment of the present invention. FIG. 6 shows Program Logic 655 embodied on a computer-readable medium 660 as shown, and wherein the Logic is encoded in computer-executable code configured for carrying out the methods of this invention and thereby forming a Computer Program Product 600. Program Logic 655 may be the same logic 505 on memory 504 loaded on processor 503 in FIG. 5. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of transitioning replication on a content addressable data storage system including a production site and a replication site from asynchronous replication to synchronous replication, the computer-executable method comprising:
receiving a request to perform replication in a transition mode, wherein the transition mode comprises transitioning from asynchronous replication to synchronous replication, wherein the transition mode is enabled to perform asynchronous replication and synchronous replication simultaneously; and
changing the content addressable data storage system to the transition mode, wherein the content addressable data storage system transitions the content addressable data storage system from using asynchronous replication to synchronous replication, wherein the content addressable data storage system is enabled to receive data IOs while in the transition mode;
wherein during the transition mode, the content addressable data storage system transitions from asynchronous replication to synchronous replication by synchronously replicating a portion of received input/output (I/Os) if the portion of received input/output (I/Os) is updated after a scanning process has scanned an entry associated with the portion of received input/output (I/Os) and asynchronously replicating a second portion of received I/Os when the scanning process scans an entry associated with the second portion of received I/Os, until the content addressable data storage system has completed transitioning.

2. The computer-executable method of claim 1, wherein when the content addressable data storage system is in the transition mode:
creating a snapshot;
replicating the snapshot to the replication site; and
processing data on the production site in relation to the snapshot.

3. The computer-executable method of claim 2, wherein processing comprises:
comparing each entry of a production Address to Hash (A2H) table to each entry of an A2H table of the snapshot to determine whether the production A2H table contains updated data;
replicating differences between entries of the production A2H table and entries of the snapshot A2H table to the remote site.

4. The computer-executable method of claim 3, wherein comparing each entry of the production A2H table to the each entry of the snapshot A2H table is completed sequentially.

5. The computer-executable method of claim 3, wherein comparing comprises:
scanning, by the scanning process using a scanning pointer, each entry of the production A2H table and each entry of the snapshot A2H table starting at a first entry and continuing sequentially each A2H table.

6. The computer-executable method of claim 5, further comprising:
receiving a data update to a portion of the production A2H already scanned; and
replicating synchronously the received data.

7. The computer-executable method of claim 5, further comprising:
receiving a data update to a portion of the production A2H not previously scanned, wherein the production site waits to replicate the received data until scanned.

8. A system, comprising:
a content addressable data storage system including a production site and a replication site; and
computer-executable program logic encoded in memory of one or more computers enabled to transition replication on the content addressable data storage system from asynchronous replication to synchronous replication, wherein the computer-executable program logic is configured for the execution of:
receiving a request to perform replication in a transition mode, wherein the transition mode comprises transitioning from asynchronous replication to synchronous replication, wherein the transition mode is enabled to perform asynchronous replication and synchronous replication simultaneously; and
changing the content addressable data storage system to the transition mode, wherein the content addressable data storage system transitions the content addressable data storage system from using asynchronous replication to synchronous replication, wherein the content addressable data storage system is enabled to receive data IOs while in the transition mode;
wherein during the transition mode, the content addressable data storage system transitions from asynchronous replication to synchronous replication by synchronously replicating a portion of received input/output (I/Os) if the portion of received input/output (I/Os) is updated after a scanning process has scanned an entry associated with the portion of received input/output (I/Os) and asynchronously replicating a second portion of received I/Os when the scanning process scans an entry associated with the second portion of received I/Os, until the content addressable data storage system has completed transitioning.

9. The system of claim 8, wherein when the content addressable data storage system is in the transition mode:
creating a snapshot;
replicating the snapshot to the replication site; and
processing data on the production site in relation to the snapshot.

10. The system of claim 9, wherein processing comprises:
comparing each entry of a production Address to Hash (A2H) table to each entry of an A2H table of the snapshot to determine whether the production A2H table contains updated data;
replicating differences between entries of the production A2H table and entries of the snapshot A2H table to the remote site.

11. The system of claim 10, wherein comparing each entry of the production A2H table to the each entry of the snapshot A2H table is completed sequentially.

12. The system of claim 10, wherein comparing comprises:

scanning, by the scanning process using a scanning pointer, each entry of the production A2H table and each entry of the snapshot A2H table starting at a first entry and continuing sequentially each A2H table.

13. The system of claim 12, wherein the computer-executable program logic is further configured for the execution of:
receiving a data update to a portion of the production A2H already scanned; and
replicating synchronously the received data.

14. The computer-executable method of claim 12, wherein the computer-executable program logic is further configured for the execution of:
receiving a data update to a portion of the production A2H not previously scanned, wherein the production site waits to replicate the received data until scanned.

15. A computer program product for transitioning replication on a content addressable data storage system including a production site and a replication site from asynchronous replication to synchronous replication, the computer program product comprising:
a non-transitory computer readable medium encoded with computer-executable code, the code configured to enable the execution of:
receiving a request to perform replication in a transition mode, wherein the transition mode comprises transitioning from asynchronous replication to synchronous replication, wherein the transition mode is enabled to perform asynchronous replication and synchronous replication simultaneously; and
changing the content addressable data storage system to the transition mode, wherein the content addressable data storage system transitions the content addressable data storage system from using asynchronous replication to synchronous replication, wherein the content addressable data storage system is enabled to receive data IOs while in the transition mode;
wherein during the transition mode, the content addressable data storage system transitions from asynchronous replication to synchronous replication by synchronously replicating a portion of received input/output (I/Os) if the portion of received input/output (I/Os) is updated after a scanning process has scanned an entry associated with the portion of received input/output (I/Os) and asynchronously replicating a second portion of received I/Os when the scanning process scans an entry associated with the second portion of received I/Os, until the content addressable data storage system has completed transitioning.

16. The computer program product of claim 15, wherein when the content addressable data storage system is in the transition mode:
creating a snapshot;
replicating the snapshot to the replication site; and
processing data on the production site in relation to the snapshot.

17. The computer program product of claim 16, wherein processing comprises:
comparing each entry of a production Address to Hash (A2H) table to each entry of an A2H table of the snapshot to determine whether the production A2H table contains updated data;
replicating differences between entries of the production A2H table and entries of the snapshot A2H table to the remote site.

18. The computer program product of claim 17, wherein comparing each entry of the production A2H table to the each entry of the snapshot A2H table is completed sequentially.

19. The computer program product of claim 17, wherein comparing comprises:
scanning, by the scanning process using a scanning pointer, each entry of the production A2H table and each entry of the snapshot A2H table starting at a first entry and continuing sequentially each A2H table.

20. The computer program product of claim 19, wherein the code is further configured to enable the execution of:
receiving a data update to a portion of the production A2H already scanned; and
replicating synchronously the received data.

* * * * *